United States Patent [19]

Hiroyasu

[11] Patent Number: 4,704,917
[45] Date of Patent: Nov. 10, 1987

[54] TRANSFER SYSTEM FOR VEHICLES

[75] Inventor: Fujikawa Hiroyasu, Hiroshima, Japan

[73] Assignee: Kanda Tekko Kabushiki Kaisha, Hiroshima, Japan

[21] Appl. No.: 800,456

[22] Filed: Nov. 21, 1985

[30] Foreign Application Priority Data

Dec. 28, 1984 [JP] Japan ................................. 59-277727
Jun. 7, 1985 [JP] Japan ............................. 60-86730[U]

[51] Int. Cl.⁴ ............................................ B60K 20/02
[52] U.S. Cl. .................................... 74/475; 74/473 R; 180/247
[58] Field of Search ............... 180/247, 248, 249, 250; 74/475, 473 R

[56] References Cited

U.S. PATENT DOCUMENTS 4,290,318  9/1981  Ookubo et al. ................ 180/247 X
4,305,309 12/1981  Ookubo et al. ................ 180/247 X
4,476,739 10/1984  Arai et al. ......................... 74/475
4,531,423  7/1985  Fogelberg ......................... 74/475
4,605,109  8/1986  Fukuchi et al. ................ 74/475 X Primary Examiner—Leslie Braun
Assistant Examiner—Dwight G. Diehl
Attorney, Agent, or Firm—Koda and Androlia

[57] ABSTRACT

A tranfer system for vehicles including front wheel and rear wheel output shafts coupled to the output side of a transmission of a four-wheel drive vehicle. The shift mechanism of the transfer system working to transmit and interrupt the transmission of power to the respective output shafts is operated by means of a single shift lever which is moved within a small range so as to draw a circular arc, thereby causing a shift cam to rotate with an appropriate angle for each shift. By means of this shift cam, two shift forks are moved interrelatedly in order to carry out power shifting. Also, an oil diffusion plate is provided in this vehicle transfer system.

4 Claims, 12 Drawing Figures

FIG. 7
FIG. 8
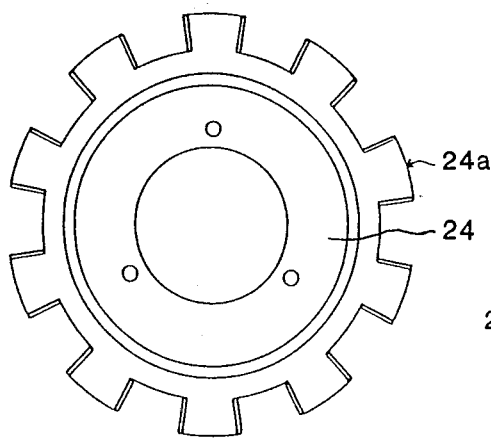
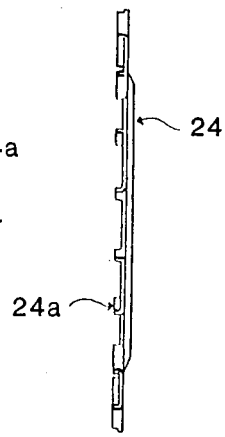
FIG. 9
FIG. 10
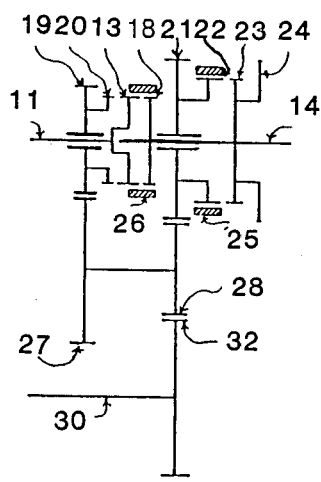
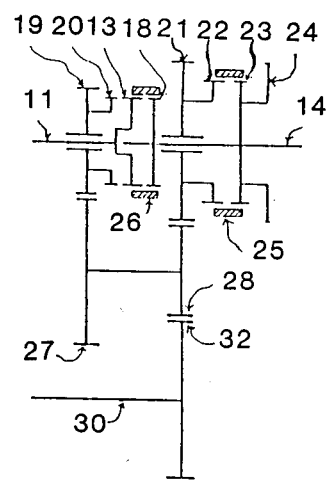
FIG. 11
FIG. 12
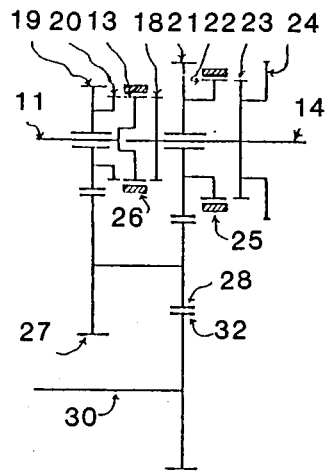
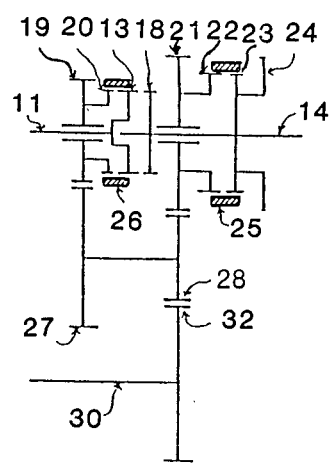

TRANSFER SYSTEM FOR VEHICLES

BACKGRUND OF THE INVENTION

1. Field of the Invention

The present invention relates to a transfer system for vehicles and more particularly to a transfer system with two output shafts for front wheel and rear wheel, which are linked to the output side of the transmission of a 4-wheel drive vehicle, whereby transmitting and disconnecting the power to the respective output shafts.

2. Prior Art

In general, a vehicle transfer system performs four different types of shifts: a two wheel (rear wheels) high speed, four wheel (front wheels and rear wheels) high speed, neutral, and four wheel low velocity shifts (hereunder, they will be indicated by 2H, 4H, N and 4L, respectively).

This shift mechanism is provided with, together with steady (state) engage gears, a plurality of external tooth (gear) clutch wheels, which are disposed on an input shaft, an output shaft for rear wheels and an output shaft for front wheels. Also, two shift forks serving to move two clutch sleeves, which have internal teeth to be engaged with the above-mentioned external tooth clutch wheels in the direction along the shaft center, are included in this shift mechanism. In addition, in order to operate the aforementioned two shift forks, two change levers are installed at the driver's seat. However, recently, instead of the foregoing shift mechanism that uses two change levers, those using a single change lever by moving linearly or moving it in the longitudinal and transverse directions such as in H-form, L-form, or U-form, have become to be used.

The shift mechanism mentioned above which uses two changes levers has another change lever for transmission installed separately at the driver seat. Thus, three change levers in total are required in such a shift mechanism. Consequently, it makes the operation difficult, and the driver tends to be confused easily. Besides, it causes cramming in terms of space, with the additional disadvantageous requirement of increase in size.

Furthermore, in the shift mechanism wherein a single change lever is moved in longitudinal and transverse directions in H-form, etc., as in change lever for transmission, the moving range of the foregoing single change lever becomes broader. Also, when such a single change lever is moved linearly, the moving distance becomes longer. As a result, the design of the driver seat becomes difficult with another drawback of unsatisfactory maneuverability.

When lubricating the bearings and gears of the foregoing transfer system, the oil pooled at the bottom of a casing is scooped up by the rotating gear and spread by the centrifugal force. This type of lubrication has drawbacks. Particularly, in the case of 2H shift, the input shaft and the rear wheel output shaft which are disposed linearly are coupled by a clutch and the rotation is transmitted directly. Accordingly, the gears on the input shaft and the rear wheel output shaft do not rotate since they are mounted through the bearings. Thus, they are not lubricated, causing trouble around the bearing areas.

SUMMARY OF THE INVENTION

The object of the present invention is to solve the problems in the conventional transfer systems for vehicles as mentioned above. The present invention provides a transfer system that is improved in driving maneuverability by compacting the movements of the shift lever.

Another object the present invention is to provide a transfer system for vehicles that is free from lubrication failure.

According to the present invention, in a casing of a transfer system that performs four types of power shifts, i.e., 2H, 4H, N, 4L, is provided with a shift cam shaft. The shift cam shaft which is connected to output side of a transmission of a 4-wheel drive vehicle is rotatably held in a transmission case. To the end of this shift cam shaft a plate form shift cam is mounted. The shift cam has cam driving portions at two locations which are an outer circumferential uneven portion and a cam hole or a cam groove. The base of a first cam arm is fixed to a shift rod, and at the top end of the first cam arm, a first cam pin is attached such that the cam pin is to be press-fit to the outer circumferential uneven portion. The shift rod mentioned above is slidably held by the casing in a form to be parallel with an input shaft and a rear wheel output shaft which are coaxial with each other.

A first shift fork mounted on the shift rod moves one of the two clutch sleeves in the axis direction, the clutch sleeves, which are mounted on the input shaft and the rear wheel output shaft together with steady engage gears, being provided with internal teeth which engage with the external teeth of a clutch wheel.

Also a spring is disposed inside the casing by positioning it at one end of the shift rod. This spring urges the shift rod in the direction to press-fit the previously mentioned first cam pin to the outer circumferential uneven portion of the shift cam.

On the other hand, a second cam pin to be fit in the above-mentioned cam hole or cam groove is held by the top end of a second cam arm. A cylindrical base of this second cam arm is slidably mounted on the shift rod. A second shift fork which moves a second clutch sleeve to the axial direction is provided on the cylindrical base of the second cam arm in a form to protrude from the foregoing cylindrical base. Furthermore, in order to perform the aforementioned four types of shifts, a plurality of positioning dents are formed in series along a part of the outer circumference of the shift cam. These dents are respectively equal in distance from the center of the shift cam shaft mentioned previously. A positioning pin is provided facing the positioning dents such that the positioning pin is given a momentum in the protruding direction, from its rear end, by a positioning spring and the top end of the positioning pin comes to fit in the positioning dent when the shift cam shaft is rotated and brought to a specified position so that the shift cam is fixed at the position.

Furthermore, at the outside end of the shift cam shaft a change arm is provided which is linked with a change lever installed at the driver's seat. With the structure described above, by rotating a single change lever in a circular arc, the two shift forks cause the two clutch sleeves to operate in mutually related manner, thereby effecting the previously mentioned four types of power shifts. This way, the change lever at the driver seat is made into a single compact form, and a transfer system with good maneuverability can be provided.

In addition, according to the present invention, a circular plate form or polygonal plate form oil diffusion plate is provided. This oil diffusion plate is relatively large in diameter, and if necessary, impeller blades can be formed along the outer circumference of the oil diffusion plate. The oil diffusion plate is installed directly to the rear wheel output shaft of the transfer system, or it is installed by using parts which are mounted on the rear wheel output shaft, such as external tooth clutch. Thus, even when the gear that functions to spread the oil does not rotate in the 2H state in which the input shaft is linked directly with the output shaft for rear wheel, the foregoing oil diffusion plate works to effect the lubrication in the transfer system.

BRIEF DESCRIPTION OF THE DRAWINGS

FIG. 3 shows the 2H shift state, FIG. 4 shows the 4H shift state, FIG. 5 shows the N shift state, and FIG. 6 shows the 4L shift state;

FIG. 7 is a front view showing an example of an oil diffusion plate;

FIG. 8 is a side view of the oil diffusion plate in FIG. 7; and

FIGS. 9, 10, 11 and 12 are skeleton diagrams showing the respective shift states of the gearings shown in FIG. 1 wherein FIG. 9 shows the 2H shift state, FIG. 10 shoes the 4H shift state. FIG. 11 shows the N shift state, and FIG. 12 shows the 4L shift state.

DETAILED DESCRIPTION OF THE INVENTION

The present invention relates to a transfer system for vehicles, and a detailed description of the preferred embodiments will be given below with reference to the drawings.

Figure 1:
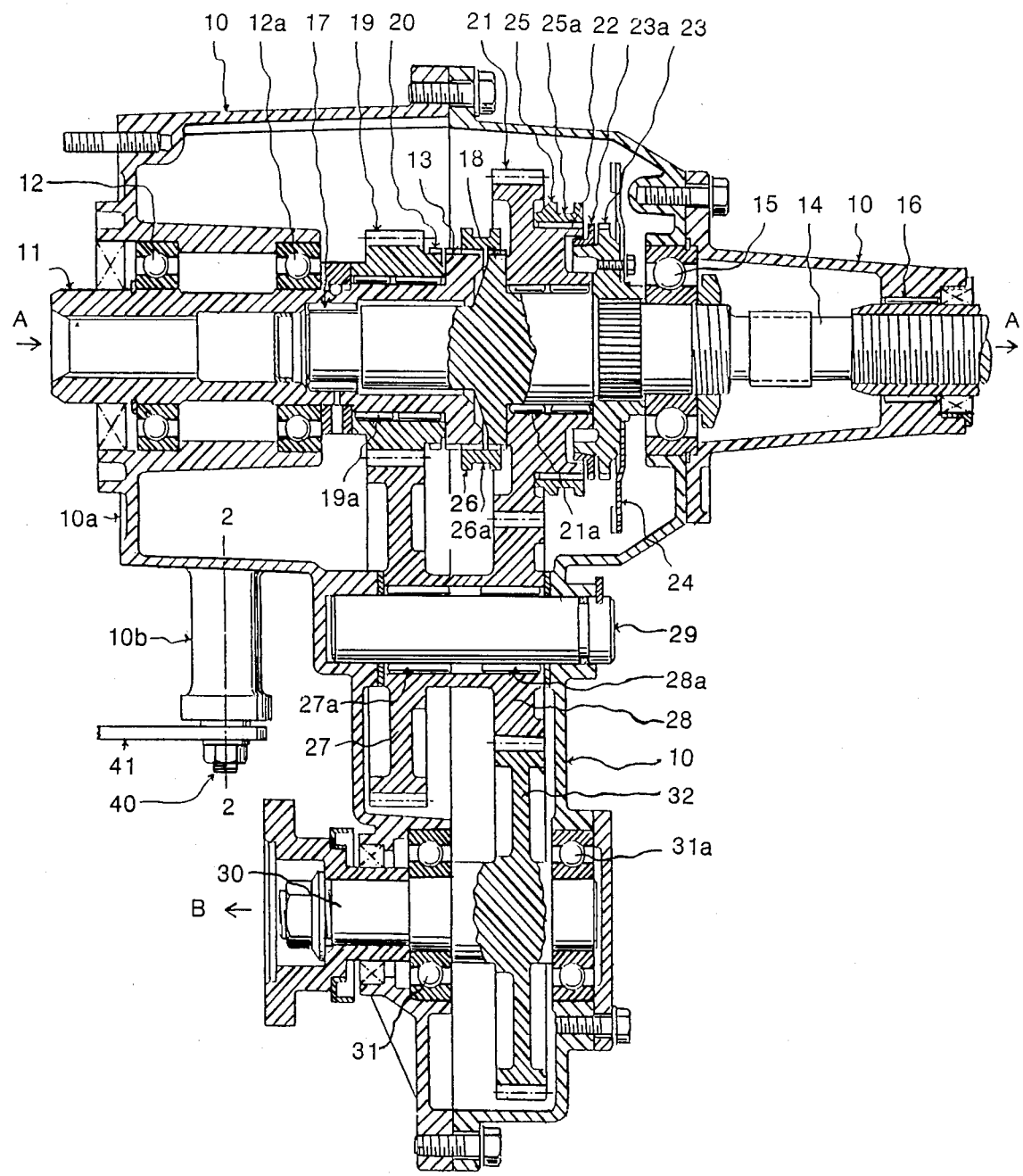
FIG. 1 is a sectional view of a transfer system in the 2H shift state, as an embodiment of the transfer system for vehicles of the present invention.
Figure 2:
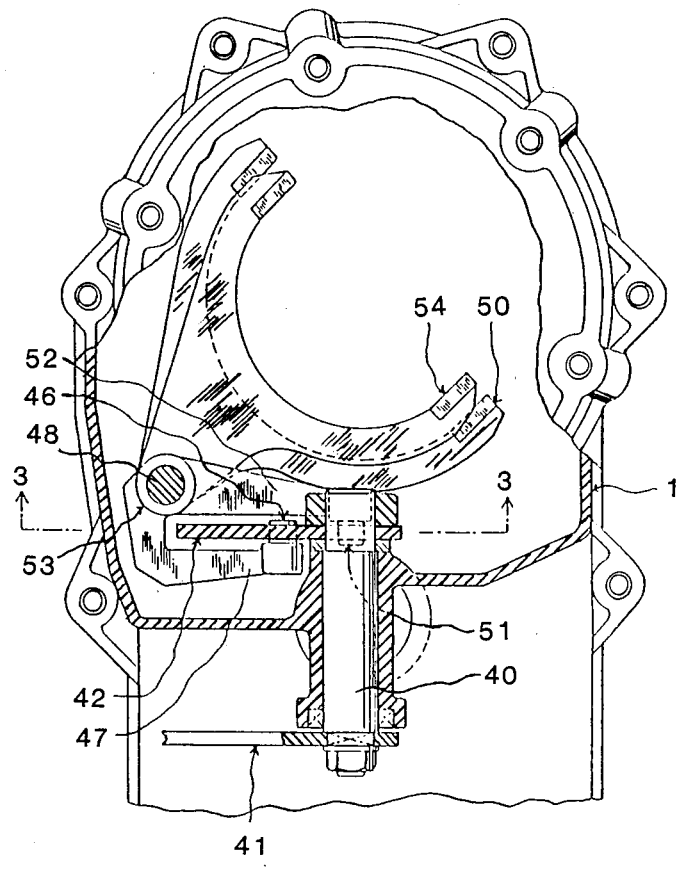
FIG. 2 is a side view of an essential portion taken along the line 2—2 that cuts through a part of the embodiment shown in FIG. 1, by viewing it from the direction of arrow A.

The description of the power transmission system of the transfer system for vehicles will be provided by referring to FIG. 1.

That indicated by 10 is a casing. This casing 10 is linked to a transmission (not shown) at its left end.

The numeral 11 is an input shaft that is supported by the casing 10 by means of bearings 12 (12a). The one end of the input shaft 11 protrudes to the transmission coupling face 10a of the casing 10 and is coupled with the transmission output shaft (not shown).

First external tooth clutch 13 includes a flange formed at one end of the input shaft 11 and gear teeth are provided on the outer circumference of the flange.

That designated by 14 is an output shaft for the rear wheel. This output shaft for the rear wheel 14 drives the rear wheel through a coupling with a propeller shaft in the direction of arrow a. The output shaft 14 is held in the casing 10, on the same axis as the input shaft 11, by means of a bearing 15 and a needle bearing 16. One end of the output shaft 14 for the rear wheel is inserted to the hollow portion of the input shaft 11, and held by a needle bearing 17.

The numeral 18 is a second external tooth clutch provided on the output shaft 14. This second external tooth clutch 18 includes a flange formed at the position adjacent to the first external tooth clutch 18 of the input shaft 11 and teeth like those of the first external tooth clutch 18 are formed along the outer circumference of the flange.

A low velocity drive gear 10 is held rotatably on the input shaft 11 close to the first external tooth clutch 18 by means of needle bearing 18a.

Designated by 20 is a third external tooth clutch formed integrally on the low velocity drive gear 19. This third external tooth clutch 20 is provided on the side facing the first external tooth clutch 13. The outer circumference of the third external tooth clutch 20 is provided with teeth like those of the first external tooth clutch 13 as well as the second external tooth clutch 18.

Numeral 21 represents a high speed drive gear. This high speed drive gear 21 is rotatably held on the output shaft 14 for the rear wheel adjacent to the second external tooth clutch 18, in an optionally rotatable manner, by means of needle bearing 21a.

Denoted by 22 is a fourth external tooth clutch formed as an internal part of the high speed drive gear 21, and teeth are formed on its outer circumference.

A fifth external tooth clutch 23 is provided on the output shaft 14 for the rear wheel at the position adjacent to the fourth external tooth clutch 23 by spline fitting. This fifth external tooth clutch 23 includes a synchro-external tooth clutch 23a provided with the same external teeth as those of the clutch 23.

That marked with 24 is an oil diffusion plate. This oil diffusion plate 24 is mounted on the side of the fifth external tooth clutch 23 and the outer diameter of the plate 24 is set such that the outer edge comes close to the inner wall of the casing 10. Along the outer circumference of this oil diffusion plate 24, a plurality of diffusion blades 24a are formed as shown in FIGS. 7 and 8. This outer circumferential portion dips into the oil pooled at the bottom of the casing 10. One of the essential features of the present invention is the provision of this oil diffusion plate 24.

Numeral 25 represents a first clutch sleeve provided with internal teeth. By having the internal teeth engaged with the external teeth of the fourth external tooth clutch 22 and fifth external tooth clutch 23, the first clutch sleeve 25 engages with the foregoing clutches 22 and 23 in a manner to slide in the axial direction. On the outer circumference of the first clutch sleeve 25 a groove 25a for fitting a first shift fork is formed. The groove 25a will be described later in detail.

A second clutch sleeve 26 the same as the clutch sleeve 25 is provided with internal teeth. When the internal teeth engage with the external teeth of the first external tooth clutch 13, the second external tooth clutch 18 and the third external tooth clutch 20, the second clutch sleeve 26 engages with those external tooth clutches 13, 18 and 20 so as to slide along in an axial direction. This second clutch sleeve 26 is provided with a groove 26A on the outer circumference, and a second shift fork 54 that will be mentioned later is fitted to the groove 26a.

That marked 27 is a major diameter intermediate gear, and 29 is a minor diameter intermediate gear. These gears 27 and 28 are constructed forming a single body and rotatably held on an intermediate shaft 29 by needle bearings 27a and 28a. The intermediate shaft 29 is fixed to the casing 10. The major diameter intermediate gear 27 is constantly engaged with the law velocity drive gear 19 mounted on the input shaft 11. The minor diameter intermediate gear 28 is always engaged with the high speed drive gear 21 disposed over the output shaft for the rear wheel 14 as well as with a front wheel drive gear 12 that will be described later.

An output shaft 30 for the front wheel transmit power to the front wheel in the direction of arrow b. This output shaft 30 is held by the casing 10 by means of bearing 31 and 31a. A front wheel drive gear 32 is formed integrally on the output shaft for the front wheel 30. As mentioned previously, the minor diameter intermediate gear 28 engages with the front wheel drive gear 32 all the time.

Hereunder the structure of the power shift system that is the essential part of this invention will be described with reference to FIGS. 2, 3, 4, and 5.

In these Figures, 40 is a shift cam shaft, and it is supported by a protruding boss 10b (see in FIG. 1) of the casing 10 in a freely rotatable manner.

Numeral 41 is a change arm with its one end held by the outside end of the shift cam shaft 40. A change lever (not shown) located at the driver's seat is linked to the change arm 41.

A shift cam 42 is attached to the inside end of the shift cam shaft 40. On the surface of this shift cam 42, a cam guide 43 is formed, and also an outer circumferential uneven portion 44 is formed on the edge of the plate surface of the shift cam 42. Furthermore, on a part of the outer circumference of the shift cam 42, four positioning dents 45 are formed in a row along the circular are with equal distance from the center of the shift cam 40.

That marked with 46 is a first cam pin. This first cam pin 46 is attached to the upper end of a first cam arm 47 and in contact with the outer circumferential uneven portion 44 of the shift cam 42.

A shift rod 48 is slidably held by the casing 10. The base end of the first cam arm 47 is fixed near one end of this shift rod 48.

Numeral 49 is a spring. This spring 49 is held in the casing 10, and it presses one end of the shift rod 48. In this manner, by way of the first cam arm 47, the spring 49 gives the momentum to the first cam pin 46 in the direction to constantly press the first cam pin 48 to the outer circumferential uneven portion 44 of the shift cam 42.

That indicated by 50 is a first shift fork. The base end of the first shift fork 50 is fixed near the other end of the shift rod 48, and a semi-circular-arc-form fork portion of the first shift fork 50 is engaged with the groove 25a of the first clutch sleeve 25.

A second cam pin 51 is provided at an end of a second cam arm 52 and fits in the cam hole 43 of the shift cam 42. The base end of the second cam arm 52 is a cylindrical portion 53, and this cylindrical portion 53 is slidably mounted on the shift rod 48.

That represented by 54 is a second shift fork. This shift fork 54 is formed projected at the end of the cylindrical portion 53 of the second cam arm 52. A semi-circular-arc-form fork of the second shift fork 54 is engaged with the groove 26a of the second clutch sleeve 26.

A positioning pin 55 is slidably held in the casing 10. This positioning pin 55 is given the momentum at its bottom end by positioning spring 56 in the protruding direction. The top end of the positioning pin 55 comes to fit in the positioning dent 45, effecting the positioning of the shift cam 42.

Next, a description will be given on the operation.

Figure 3:
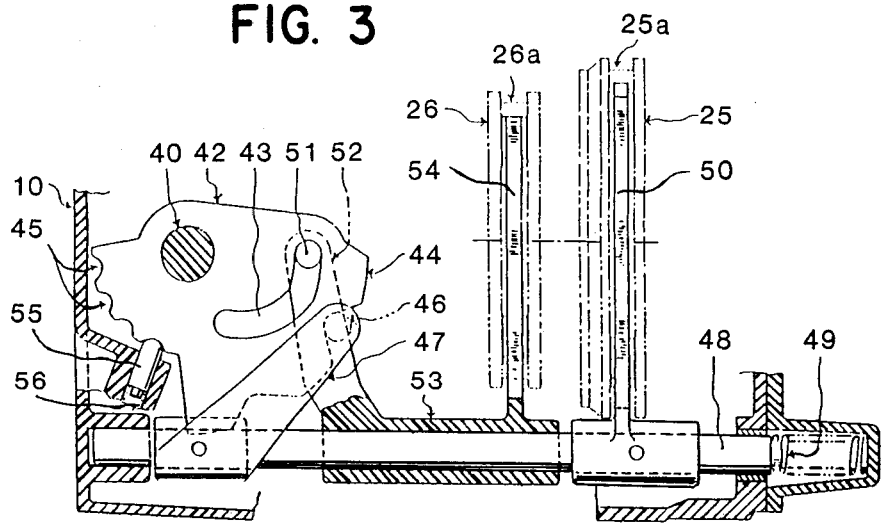
FIGS. 3, 4, 5 and 6 are side views of the shift system when a part of the essential portion in FIG. 2 is sectioned along the line 3—3 by viewing it in the direction of the arrows of that line. Of these Figures.

FIG. 1 shows the state of 2H shift that is shown in FIG. 9 as a skeleton diagram, and the power shift system in this state is in the status as shown in FIG. 3.

More specifically, the second cam pin 51 in the cam hole 43 is at the position farthest from the shift cam shaft 40. The second shift fork 54 is brought to the rightmost position in FIG. 3. The second clutch sleeve 26 is engaged with the first external tooth clutch 13 and the second external tooth clutch 18 by riding over (reaching to) both external tooth clutches 13 and 18. Thus, the rotation of the input shaft 11 is transmitted as it is to the rear wheel.

In this case, the first cam pin 46 is positioned in the recession of the outer circumferential uneven portion 44 of the shift cam 42. The first shift fork 50 is brought toward the left in FIG. 3 and has the first clutch sleeve 25 engaged only with the fourth external tooth clutch 22. The first clutch sleeve 25 is not engaged with the fifth external tooth clutch 23. Therefore, the high speed drive gear 21 that is formed integrally with the fifth external tooth clutch 22 becomes unrelated to the output shaft 14 for the rear wheel, and it is kept stationary on the output shaft 14 which rotates through the needle bearing 10a.

In the same manner, the low velocity drive gear 19 held on the input shaft 11 in freely rotatable manner by means of the needle bearing 19a is also kept stationary on the rotating input shaft 11, since the second clutch sleeve 26 is not engaged with the third external tooth clutch 20 that is formed integrally with the low velocity drive gear 19.

Accordingly, in this 2H shift state, the group of all statically (steadily) interlocked gears does not rotate. Also, the output shaft for front wheel 30 is in a stationary state. Thus, the front wheel is not driven.

In this state, the oil diffusion plate 24 fixed to the rear wheel output shaft 14 scoops up and spreads the oil pooled at the bottom of the casing 10 so that the rotational portions of the needle bearings 19a and 21a can be lubricated. In the conventional system wherein there is not an oil diffusion plate, a high speed drive gear serving to spread the oil is likely to burn because of lubrication failure. However, there is no such problem in the present invention.

This oil diffusion plate 24 may be formed simply into a circular plate or a polygonal plate. When the diffusion plate (impeller) blades 24a are provided along the outer circumference as shown in FIGS. 7 and 8, the spreading effect can further be improved.

Figure 4:
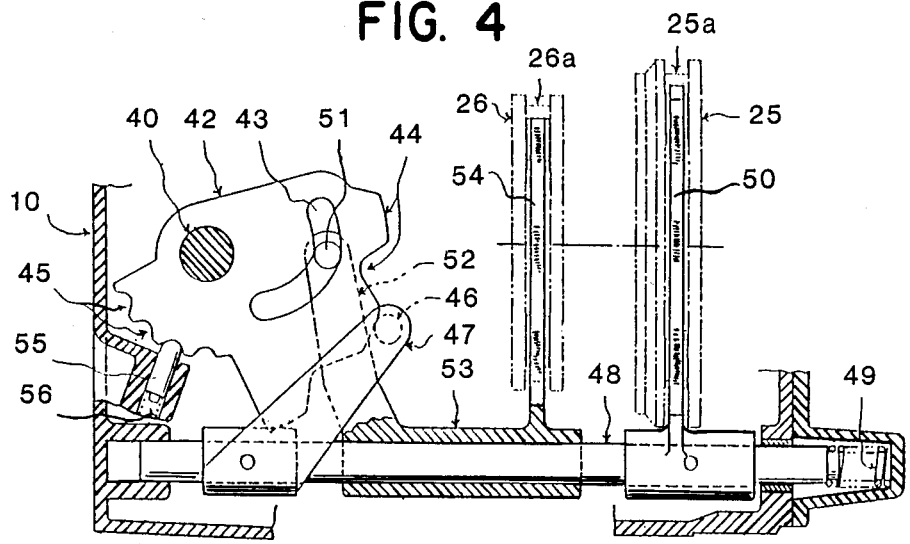

Next, when the change arm 41 is rotated to bring the shift cam 42 to the position shown in FIG. 4, the 4H shift state as shown in the skeleton diagram in FIG. 10 is obtained.

More specifically, in FIG. 4, the first cam pin 48 is pushed up by the protrusion of the outer circumferential uneven portion 44 of the shift cam 42 so that the shift rod 48 is brought toward the right side, against the spring 49. This in turn causes the first clutch sleeve 25 to be engaged with the fourth external tooth clutch 22 and the fifth external tooth clutch 23 in a form to ride over both external tooth clutches as shown in FIG. 10, thereby coupling the rear wheel output shaft 14 with the high speed drive gear 21.

Meanwhile, the second cam pin 51 stays at the same position since the cam hole 43 lies the same distance from the center of the shift cam shaft 40 as the state shown in FIG. 3. Accordingly, as in FIGS. 1 and 9, the second clutch sleeve 26 is engaged with the first external tooth clutch 13 and the second external tooth clutch 18 by riding over those two external tooth clutches 13 and 18. Thus, the rotation of the input shaft 11 is transmitted as it is to the rear wheel output shaft 14. Furthermore, by way of the fifth external tooth clutch 23, the first clutch sleeve 25, the fourth external tooth clutch 22, the high speed drive gear 21, the minor diameter intermediate gear 28 and the front wheel drive gear 32, the rotation is transmitted to the front wheel output shaft 30. As a result, both the front and rear wheels are driven.

In this case, because the high speed drive gear 21 and the front wheel drive gear 32 are set to be the same in number of teeth, with the minor diameter intermediate gear 28 placed in between, the rear wheel output shaft 14 and the front wheel output shaft 30 rotate at high speed in the same rotational direction with the same rotational frequency. Thus, the 4H shift state is brought about.

Figure 5:
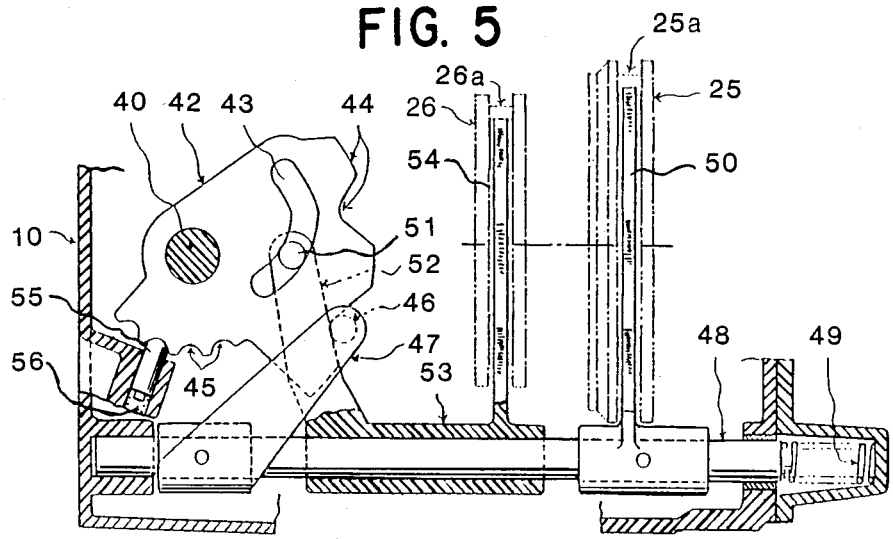

Next, when the shift cam 42 is brought to the position shown in FIG. 5 through rotating the change arm 41, the N shift state as shown by the skeleton diagram in FIG. 11 is obtained.

Specifically, in FIG. 5, the first cam pin 46 again fits into the recession of the outer circumferential uneven portion 44 of the shift cam 42. Thus, the spring 49 pushes the shift rod 48 toward the left side, bringing the first shift fork 50 and the first clutch sleeve 25 into the same sate as that in FIG. 9. Therefore, the rear wheel output shaft 14 and the high speed gear 21 are released from their engagement, and the transmission of the rotation is stopped.

On the other hand, the second cam pin 51 moves left slightly by being guided by the cam hole 43, and the second shift fork 54 positions the second clutch sleeve 26 only on the first external tooth clutch 13 so that the clutch sleeve 26 is separated from the second external tooth clutch 18. Therefore, the rotation of the input shaft 11 is not transmitted to the rear wheel shaft 14 and the front wheel output shaft 30 are not driven. Thus, as in FIG. 3, the group of the gears which are engaged statically does not rotate and they enter into the N shift state.

Figure 6:
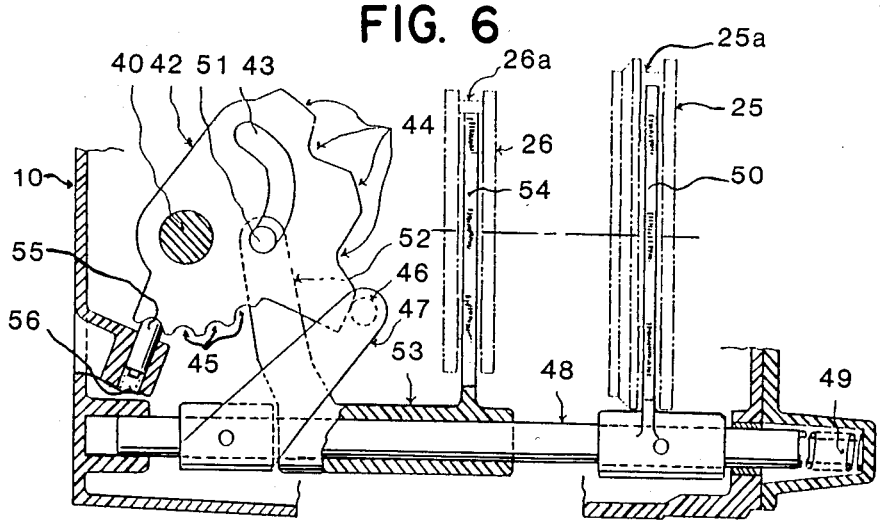

Then, when the change arm 41 is rotated to bring the shift cam 42 to the position shown in FIG. 6, the 4L shift state shown in the skeleton diagram of FIG. 12 is brought about.

More specifically in FIG. 6. the first cam pin 46 is again pressed to be positioned on the protrusion of the outer circumferential uneven portion 44 of the shift cam 42 so that the shift rod 48 is pressed toward the right side against the spring 49. Consequently, as in FIG. 4, the first shift fork 50 moves toward the right side. As a result, as shown in FIG. 12, the first clutch sleeve 25 becomes engaged with the fourth external tooth clutch 22 as well as with the fifth external tooth clutch 23 by riding over the external tooth clutches 22 and 23. This way, the rear wheel output shaft 14 is coupled with the high speed drive gear 21. In the meantime, the second cam pin 51 is guided by the cam hole 43 and moves to the leftmost position. Thus, the second shift fork 54 causes the second clutch sleeve 26 to be interlocked with the first external tooth clutch 13 and the third external tooth clutch 20, by riding over these external tooth clutches 13 and 20. As a result, the rotation of the input shaft 11 is transmitted to the front wheel drive gear 32, from the minor diameter low velocity drive gear 19 that is constructed integrally with the third external tooth clutch 20, by way of the major diameter intermediate gear 27 and the minor diameter intermediate gear 28, thereby rotating the front wheel output shaft 30. As the same time, from the minor diameter intermediate gear 28, through the high speed drive gear 21, the fourth external tooth clutch 22, the first clutch sleeve 25 and the fifth external tooth clutch 23, the rotation is transmitted to the rear wheel output shaft 14. Thus, both the rear and front wheels are driven.

In this case, a single speed reduction is effected from the minor diameter low velocity drive gear 19 to the major diameter intermediate gear 27. Furthermore, from the minor diameter intermediate gear 28 to the high speed drive gear 21 and the front wheel drive gear 32 which are large in diameter and have the same-number of teeth, a double speed reduction is effected. Therefore, the rear wheel output shaft 14 and the front wheel output shaft 30 are decelerated to the same rotational frequency in the same direction. Thus, the 4L shift state is obtained.

The positional fixation of the shift cam 42 in the above-mentioned four types of shifts is made when the top of the positioning pin 55 protrudingly held in the casing 10 by the positioning spring 56 fits into one of the positioning dents 45 formed in series along a part of the outer circumference of the shaft cam 42. In this manner, the shift cam 42 is fixed at its position.

As has been described above, through the use of the transfer system for vehicles provided by the present invention, the shift operation can be performed with a single lever that moves to draw a circular arc form within a small range. Therefore, the operation is simple and easy to understand, and the excellent maneuverability fitting the contemperary sense can be obtained. Also, it becomes feasible to secure a large, spacious and comfortable driving area. Furthermore, the transfer system is made compact and the gear train as well as the shift mechanism is simplified. At the same time, any defective lubrication can be prevented. Such desirably features facilitate the designing of the vehicle.

While the preferred embodiments of the invention have been described, such description is for illustrative purposes only. It will be obvious to those skilled in the art that changes and variations may be made in details of structure without departing from the scope of the present invention which are delineated by the following claims.

I claim:

1. A transfer system for vehicles comprising:
    a casing for a transfer system which is connected to an output side of a transmission of a four wheel drive vehicle;
    a shift cam shaft rotatably held by said casing;
    a plate form shift cam mounted on an inside end of said shift cam shaft, said plate form shift cam being provided with an outer circumferential uneven portion and a cam hole or a cam groove formed through the cam plate;
    a first cam pin which press-fits to said outer circumferential uneven portion;
    a second cam pin which fits in said cam hole of said cam groove;
    a first shift sleeve and a second shift sleeve disposed on an input shaft and a rear wheel output shaft which are coaxial to each other; and
    a first shift fork and a second shift fork which move said first shift sleeve and the second shift sleeve along the shaft center by way of coupling members which are linked mechanically with said first cam pin and second cam pin, said coupling members comprising:
- a first cam arm provided with said first cam pin at the top end;
- a shift rod slidably held by said casing such that the rod slides parallel with said input shaft and rear wheel output shaft which are disposed integrally with each other, said shift rod being provided with the base of said first cam arm at one end and said first shift fork at the other end; and
- a second cam arm provided on one end of a cylindrical base slidably mounted on said shift rod, said second cam pin bring fixed at the top end of said second cam arm, said cylindrical base being provided with a second shift fork at the other end.

2. A transfer system according to claim 1, said system further including a spring which urges one end of said shift cam shaft such that said first cam pin press fits said outer circumferential uneven portion of said shift cam.

3. A transfer system according to claim 1, wherein said shift cam is provided with a series of positioning dents along the outer circumference thereof, said series of dents being equal in distance from the center of said shift cam, and said system further including a positioning pin that positions said shift cam when fitting into said positioning dent by means of a positioning spring slidably, provided in said casing.

4. A transfer system according to claim 1, wherein four types of shift are set including two wheel drive high speed shift in which only rear wheels are driven at high speed, a four-wheel high speed shift in which both rear wheels are front wheels are driven at high speed, a neutral shift, and a four-wheel low speed shift in which both front wheels and rear wheels are driven at low speed.

* * * * *